Feb. 12, 1929.
F. E. CASEY
1,701,491
DOOR LOCKING EQUIPMENT FOR CABIN TYPE AIRCRAFT
Filed Nov. 26, 1928
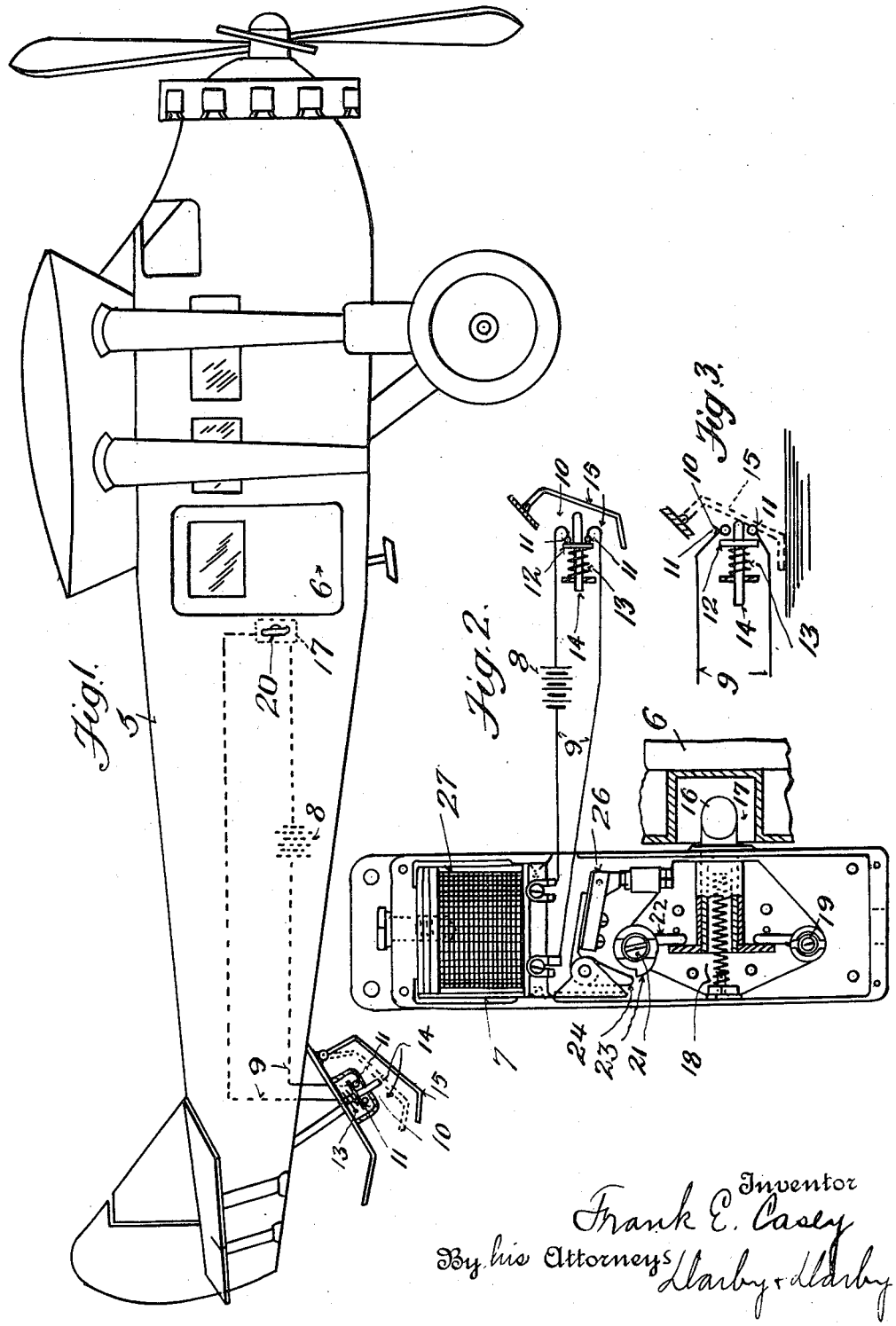
Inventor
Frank E. Casey
By his Attorneys
Darby & Darby Patented Feb. 12, 1929.

1,701,491

UNITED STATES PATENT OFFICE.

FRANK E. CASEY, OF CHICAGO, ILLINOIS, ASSIGNOR TO NATIONAL PNEUMATIC COMPANY, OF NEW YORK, N. Y., A CORPORATION OF WEST VIRGINIA.

DOOR-LOCKING EQUIPMENT FOR CABIN-TYPE AIRCRAFT.

Application filed November 26, 1928. Serial No. 321,835.

This invention relates to door locking equipment for cabin type aircraft.

The object of the invention is to provide a safety door locking equipment for the cabin doors of aircraft which is simple and efficient, and wherein, after the aircraft arises from the ground, its cabin door is automatically locked closed, but when the airship reaches the ground the cabin door lock is released, so that the door may be opened.

A further object of the invention is to provide an electrically operated door lock for the cabin doors of aircraft, the electric circuit therefor being automatically controlled by the aircraft reaching or rising from, the ground.

Further objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawings,—

Figure 1 is a view in side elevation illustrating an airplane and the application thereto of an electrically operated cabin door lock equipment which is automatically controlled in accordance with the principles of my invention;

Figure 2 is a view in elevation of an electrically controlled door lock mechanism suitable for use in the combination embodying my invention; and Figure 3 is a detached detailed view in diagram illustrating the operation of the automatic circuit controller for the electrically operated door locking equipment embodying my invention.

The same part is designated by the same reference numeral wherever it occurs throughout the several views.

In the safety operation of aircraft, particularly aircraft of the cabin type, it is important to provide means by which the door which closes the entrance to the cabin of the aircraft may be retained locked against opening during the time the aircraft is in flight, to prevent the opening of the door by accident, design, or otherwise, thereby endangering the safety of the occupant or occupants of the cabin. It is equally important to provide means by which the door may be readily opened when the aircraft is resting on the ground so as to enable the occupants of the cabin to descend therefrom or to enter the same. It is also important that the control of the door lock of the cabin, to cause the locking of the door while the aircraft is in flight, and its release while resting on the ground, be effected automatically and without the intervention of unauthorized manipulation either within or outside the cabin.

It is among the special purposes of my present invention to provide a locking equipment for the doors of the cabin type of aircraft which is simple and efficient, and whereby during the period the aircraft is in flight, its cabin door is automatically locked and maintained locked in its closed position but when the aircraft alights it is automatically released.

Referring to the drawing:

Reference numeral 5 designates generally an aircraft of the cabin type, and 6 the door for the cabin thereof. Associated with the door is a lock mechanism indicated generally at 7 which may be of any suitable or convenient electrically controlled or operated type. A battery for supplying current for the operation and control of the lock is indicated at 8. Included in the circuit 9 of the lock 7 and battery 8 is a switch device indicated generally at 10 adapted to automatically close, and to maintain closed, the battery circuit while and during the time the aircraft is in flight, and to automatically open the same when the aircraft reaches or rests upon the ground. Any suitable or convenient type of circuit control device 10 may serve the desired purpose. A simple arrangement is indicated wherein contact points 11 disposed in the circuit 9 are bridged by a contact member 12 normally pressed, by means of a spring 13, into bridging relation with respect to said contacts. The contact member 12 is carried by a rod 14 arranged to be engaged by a hinged arm 15 depending from a convenient part of the body of the aircraft 6 into position to strike or engage the ground, and thereby to be rocked or swung towards the rod 14, when the aircraft approaches or is resting upon the ground, as clearly indicated by the dotted lines in Figs. 1 and 3. In this manner the contact member 12 is displaced from bridging relation with respect to the contact points 11, thereby opening the circuit of the door lock device. When, however, the aircraft is in flight the lever 15 swings away by gravity from the rod 14 thereby permitting spring 13 to shift said rod 14 into position to carry bridging member 12 into bridging relation with respect to the contacts 11, thereby again completing the circuit of the battery 8 to and through the lock control mechanism.

As above indicated the door lock mechanism and the electrical devices for controlling or actuating the same may be of any suitable or convenient structure. An illustrative arrangement is shown in Fig. 2 wherein a lock bolt 16 is employed to engage a keeper 17, one of the parts being mounted on the door post and the other on the door 6 of the cabin of the aircraft. As usual, and as shown in the form selected for illustrating purposes, the lock bolt 16 is normally projected by spring 18 into locking engagement with the keeper 17. A key operated device 19 may be employed for releasing the lock bolt 16 from keeper 17 when desired. The key for operating the device 19 may be confided, for example, to the custody of the aircraft pilot. In addition to the key operated device 19 for releasing the lock bolt an ordinary hand grip device, indicated at 20, in Fig. 1, may be employed to actuate a bolt retracting mechanism shown at 21, see Fig. 2. As usual, the hand grip device 20 is carried by a bolt which extends transversely through the door, or the door jamb, as the case may be, and has mounted thereon within the casing of the lock mechanism an arm or finger 22 which serves as a roll-back to engage and retract the lock bolt 16 in the usual manner. However, to prevent the actuation of the bolt operating hand grip 20 at unauthorized times, that is at a time during a flight of the aircraft, the bolt operated mechanism is provided with a shoulder 23 with which cooperates a detent 24. In the illustrative form shown this detent is in the form of a bell crank lever, pivoted at its angle as at 25 within the lock casing, and one of its arms carries an armature 26, the other arm thereof constituting the detent 24. The armature 26 is attracted by the electromagnet 27 when the latter is energized, thereby rocking the bell crank lever and bringing its detent 24 into locking engagement with the shoulder 23 of the bolt device, thereby preventing the bolt retracting device 21 from being actuated.

This condition is maintained as long as the circuit of the electromagnet 27 remains closed. This circuit remains closed during the whole of the time the aircraft is in flight. This is due to the fact that the lever 15 is out of engagement with the rod 14 which carries the bridging member 21, and hence permitting the bridging member 12 to bridge the space between the contacts 11, and close the circuit of the battery through the electromagnet 27 of the locking apparatus. However, when the aircraft reaches, or is resting on the ground, the lever 15 is rocked as above explained thereby opening the circuit of the battery 8 between the contacts 11, whereupon the armature 26 drops away from the magnet. This carries the detent 24 out of engagement with the shoulder 23, and releases the bolt retracting device 21, to permit the bolt 16 to be withdrawn from the keeper 17 either from the inside or from the outside of the cabin door.

It will be understood that many variations and changes in the details of structure of latch bolt operating mechanism, and of automatic control therefor, will readily suggest themselves to persons skilled in the art and still fall within the scope of my invention. The important and essential feature of my invention is the provision of an automatically controlled door lock for use in connection with the cabin doors of aircraft whereby it is impossible to unlock the cabin door, either from the inside or from the outside, but more particularly from the inside, during the time the aircraft is in flight, but which is released to permit the cabin door to be opened, when the aircraft is resting upon or in contact with the ground.

What I claim as new and useful and of my own invention and desire to secure by Letters Patent is:

1. In a door locking equipment for the cabin of aircraft, and in combination with an aircraft of the cabin type, and a door therefor, of a lock mechanism for locking the door closed and automatically actuated devices for preventing the release of the door lock mechanism during the time the aircraft is in flight.

2. In a door locking equipment for the cabin of aircraft, and in combination with an aircraft of the cabin type, and a door therefor, of a lock mechanism for locking the door closed and automatically actuated devices for preventing the release of the door lock mechanism during the time the aircraft is in flight, said automatically actuated devices operating to release the door lock mechanism to permit the door to be opened only when the aircraft reaches or rests upon the ground.

3. The combination with an aircraft of the cabin type, and a door therefor, of a lock bolt for said door, and automatically controlled means to prevent the release of said lock bolt from door locking position, while the aircraft is in flight.

4. The combination with an aircraft of the cabin type, and a door therefor, of a lock bolt for said door, and automatically controlled means to prevent the release of said lock bolt from door locking position, while the aircraft is in flight, but permitting the release of the lock bolt when the aircraft rests upon the ground.

5. The combination with an aircraft of the cabin type and a door for the cabin thereof, of a lock bolt for said door, a manually operated device to actuate said lock bolt, a detent for locking said manually operated device against operation, and means operating automatically to move the detent into locking position when the aircraft is in flight and to release the same when the aircraft is on the ground.

6. The combination with an aircraft of the cabin type, and a door for the cabin thereof, of a lock bolt for said door, a manually operated device to actuate said lock bolt, a detent for locking said manually operated device against operation, electrically actuated devices for moving the detent into and out of locking position and means to automatically control the circuit of said devices to move the detent into locking position during the time the aircraft is in flight, and to move the same out of locking position when the aircraft is resting on the ground.

7. The combination with an aircraft of the cabin type and a door for the cabin thereof, of a lock bolt for said door, a manually operated device to actuate said lock bolt, a detent for locking said manually operated device against operation, electrically actuated devices for moving the detent into and out of locking position, a circuit for said devices, a switch arranged in said circuit and means actuated automatically according to whether the aircraft is in flight or is resting on the ground, to control said switch.

8. The combination with an aircraft of the cabin type, and a door for the cabin thereof, of a lock bolt for said door, a manually operated device to actuate said lock bolt, a detent for locking said manually operated device against operation, electrically actuated devices for moving the detent into and out of locking position, a circuit for said devices, a switch arranged in said circuit, and a rock lever depending from the aircraft and actuated by gravity while the aircraft is in flight, and by contact with the ground when said aircraft is not in flight to control said switch.

In testimony whereof I have hereunto set my hand on this seventh day of November, A. D., 1928.

FRANK E. CASEY.